United States Patent [19]
Koyama et al.

[11] Patent Number: 5,491,498
[45] Date of Patent: Feb. 13, 1996

[54] DIGITAL AUDIO DELIVERY IN A GRAPHICS CONTROLLER ARCHITECTURE

[76] Inventors: Ryo Koyama, 343 Hawthorne Ave., Palo Alto, Calif. 94301; Niall M. Bartlett, 1176 Britton Ave., San Jose, Calif. 95125

[21] Appl. No.: 152,624

[22] Filed: Nov. 15, 1993

[51] Int. Cl.⁶ .................................................. G09G 1/14
[52] U.S. Cl. ......................................... 345/190; 345/189
[58] Field of Search ........................... 395/154; 358/341, 358/335; 434/185; 345/189, 193, 190, 207, 200, 133

[56] References Cited

U.S. PATENT DOCUMENTS

| | | | |
|---|---|---|---|
| 4,641,253 | 2/1987 | Mastran | 395/154 |
| 4,786,967 | 11/1988 | Smith, III et al. | 345/207 |
| 4,884,972 | 12/1989 | Gasper | 395/154 |
| 4,905,094 | 2/1990 | Pocock et al. | 358/341 |
| 5,138,500 | 8/1992 | Haikawa et al. | 358/341 |
| 5,262,875 | 11/1993 | Mincer et al. | 358/335 |

*Primary Examiner*—Wing F. Chan
*Assistant Examiner*—Vivian W. Chang
*Attorney, Agent, or Firm*—Claude A. S. Hamrick; Robert O. Guillot

[57] ABSTRACT

An graphics/audio controller system supports the delivery of digital audio signals in a graphics controller architecture so that much of the video circuitry can also be used to process audio information. The graphics/audio controller may be implemented to accommodate either asynchronous or synchronous audio access. A memory control unit is incorporated to receive audio and video data request signals and to correspondingly access the required data from a memory section. Digital audio and video signals are provided at an output bus of the memory section and are converted to analog signals by one or more digital to analog converters. As a result of the graphics/audio controller system, efficient audio reproduction is supported while minimizing hardware requirements. In addition, the overall size and cost of the system is minimized.

10 Claims, 4 Drawing Sheets

DIGITAL AUDIO DELIVERY IN A GRAPHICS CONTROLLER ARCHITECTURE

BACKGROUND OF THE INVENTION

1. Field of the Invention

This invention relates to audio and video production circuitry and more particularly to the delivery of digital audio signals in a graphics controller architecture.

2. Description of the Relevant Art

There are a variety of types of audio-video products available today; for example, televisions, video cassette recorders, and CD ROM systems. In many of these systems, the video and audio data signals are processed digitally. Digital processing is employed largely due to the availability of a variety of methods for manipulating and transforming the data signals. These methods allow flexible and comprehensive control of the audio-video data.

In a typical audio-video system, the processing and delivery of video signals is controlled by hardware completely separate from the hardware that controls the processing and delivery of audio signals. The traditional approach of providing separate audio and video subsystems has evolved due to the inherently different characteristics associated with the processing and delivery of audio signals as opposed to the processing and delivery of video signals. For example, the data rate and modulation schemes of audio signals are typically very different from the data rate and modulation schemes of video signals.

A drawback of providing separate audio and video subsystems is the amount of hardware required. It is desirable to minimize the hardware requirements associated with audio-video products.

SUMMARY OF THE INVENTION

In accordance with the present invention, a graphics/audio controller system is provided that supports delivery of digital audio signals in a graphics controller architecture. The graphics/audio controller may be implemented to accommodate either asynchronous or synchronous audio and video data access. A memory control unit is incorporated to receive audio and video data request signals and to correspondingly access the required data from a memory section. Digital audio and video signals are provided at an output port of the memory section and are converted to analog signals by one or more digital-to-analog converters.

In one embodiment, video data is retrieved for a line of a video image, then a fixed time after the end of the line, audio data is retrieved. Typically, the audio data is retrieved during the horizontal blanking interval common to most video displays. In this way video and audio data are processed using much of the same circuitry without impeding the processing rate for either.

As a result of the graphics/audio controller system, efficient audio reproduction is supported while minimizing hardware requirements. In addition, the overall size and cost of the system is minimized through efficient use of integrated circuit area by reuse of video circuitry for audio data retrieval. Architectural compatibility of audio and video delivery permits simplified or common software and control mechanisms, including encoding of audio data on a VESA (Video Electronics Standard Association) bus.

The invention will be more readily understood by reference to the drawings and the detailed description.

DETAILED DESCRIPTION

Figure 1:
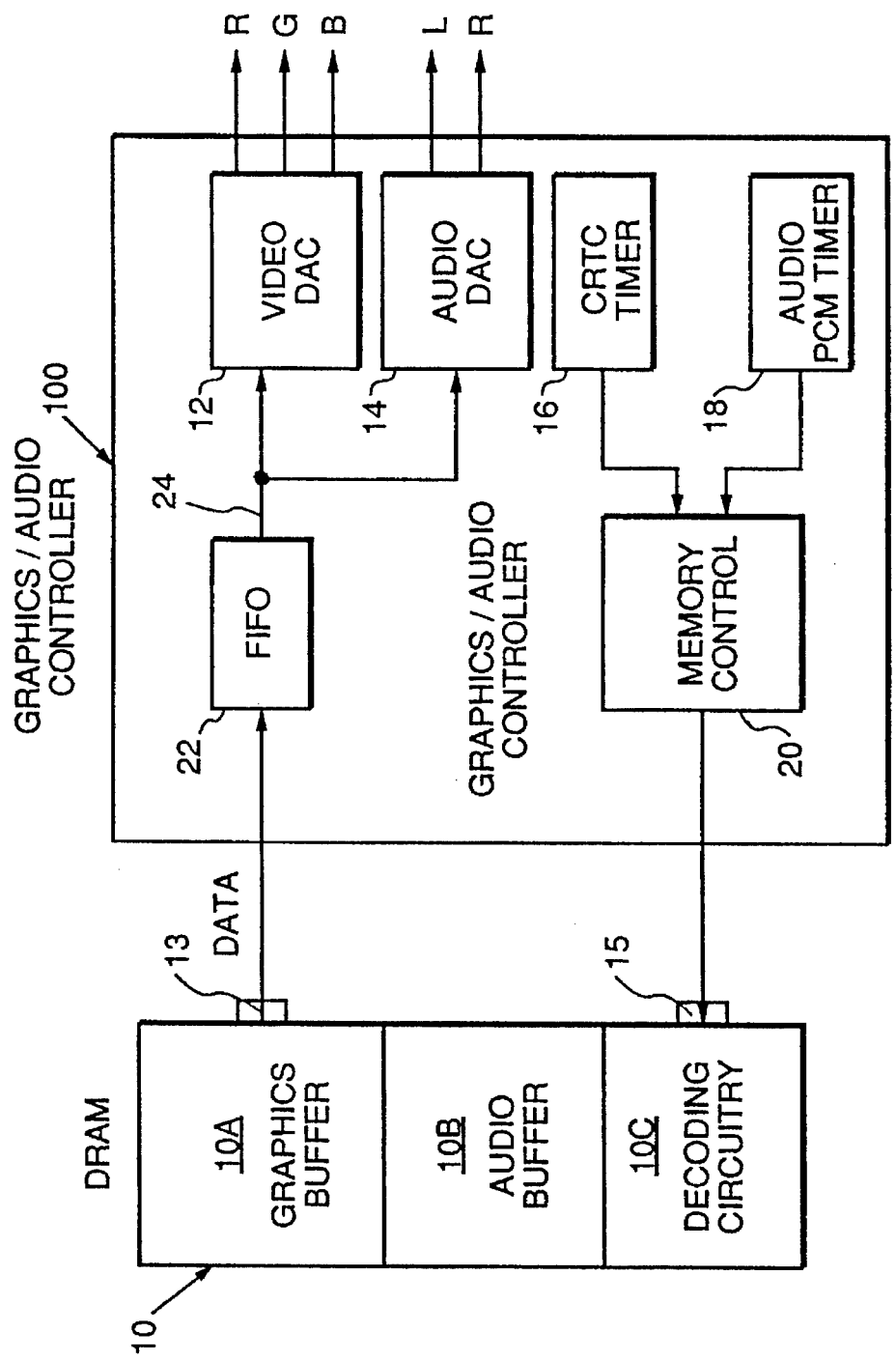
FIG. 1 is a block diagram illustrating a graphics/audio controller system with asynchronous audio and video data access in accordance with the present invention.

Referring to FIG. 1, a graphics/audio controller system is shown that supports asynchronous audio access in accordance with the present invention. The system includes a memory section 10 having a graphics buffer area 10A, an audio buffer area 10B, and decoding circuitry 10C. The memory section 10 may be implemented using DRAM technology and may be provided on the same IC as other circuit elements or may be provided on a separate IC. A video DAC (digital-to-analog converter) 12 and an audio DAC 14 receive data from the memory 10 via a data FIFO buffer 22 and a data bus 24. A memory control unit 20 is connected through an address/control port 15 to the decoding circuitry 10C of memory section 10. Finally, a CRTC (cathode ray tube controller) video timer 16 and an audio PCM (pulse code modulation) rate timer 18 are connected to memory control unit 20.

In one embodiment, the video DAC 12, the audio DAC 14, the FIFO buffer 22, the memory control unit 20, the CRTC video timer 16, and the audio PCM rate timer 18 are contained on an integrated graphics/audio controller chip 100, and DRAM 10 is contained on a separate IC.

During operation of the system, digital video information and digital audio information received from an external data source (not shown) are stored into the graphics buffer 10A and the audio buffer 10B, respectively. The external data source may be, for example, a computer memory, a hard disk, or a CD system. The CRTC timer 16 transmits video data transfer requests to memory control unit 20 at a predetermined rate. Memory control unit 20 responsively invokes access to the corresponding video data stored in graphics buffer 10A. The access of video data occurs when memory control unit 20 provides a predetermined address signal to the address/control port 15 of memory section 10 in response to a transfer request from CRTC timer 16. The decoding circuitry 10C of memory section 10 decodes the address signal from the memory control unit 20 to provide the requested data at output port 13.

The memory control unit 20 is configured to generate address signals in a predetermined sequence such that a first predetermined address is provided in response to the first-received transfer request from CRTC timer 16, a second predetermined address is provided in response to the second-received transfer request, and so on. The memory control unit 20 may include a counter circuit to achieve the address sequencing. In general, specific implementations of memory control circuitry suitable for sequencing video address signals are known to those skilled in the art. For example such circuitry is commonly employed in VGA controllers in personal computers. Similarly, DRAM memory circuitry with decode logic representation are well known to those skilled in the art.

In accordance with the invention, the audio PCM rate timer 18 generates audio data transfer requests that are received by memory control unit 20 to invoke access to the corresponding audio data stored in audio buffer 10B. As the memory control unit 20 processes each request from CRTC timer 16 and audio PCM rate timer 18, video and audio data are provided in a serial stream to the FIFO buffer 22 and to the data bus 24. FIFO buffers, such as buffer 22, are commonly employed in video systems and are necessary when the clock rate of the memory 10 does not match the rate at which video data is required for processing. The audio PCM rate timer 18 runs completely asynchronous to the CRTC timer 16 and effectively steals buffer update cycles from the memory control unit 20.

The audio DAC 14 converts the digital audio data from the data stream to continuous analog audio signals. The audio DAC 14 may provide one or more channels of output. FIG. 1 shows the audio DAC 14 with stereo output having left (L) and right (R) channels. The signals from the left and right channel are provided to an amplifier (not shown) which drives speakers (not shown). The video DAC 12 is connected in the system to convert the digital video data stream to red-green-blue (RGB) analog video signals.

Although the CRTC timer 16 and the audio PCM rate timer 18 operate asynchronously with respect to one another, the video DAC 12 operates synchronously with CRTC timer 16, so that the video DAC 12 may identify the video data in the data stream. Similarly, the audio DAC 14 operates synchronously with audio PCM rate timer 18. It is furthermore noted that the audio DAC 14 may be located exterior to the graphic/audio controller chip 100 and attached through a digital audio bus similar to the standardized VESA graphics bus.

Figure 2:
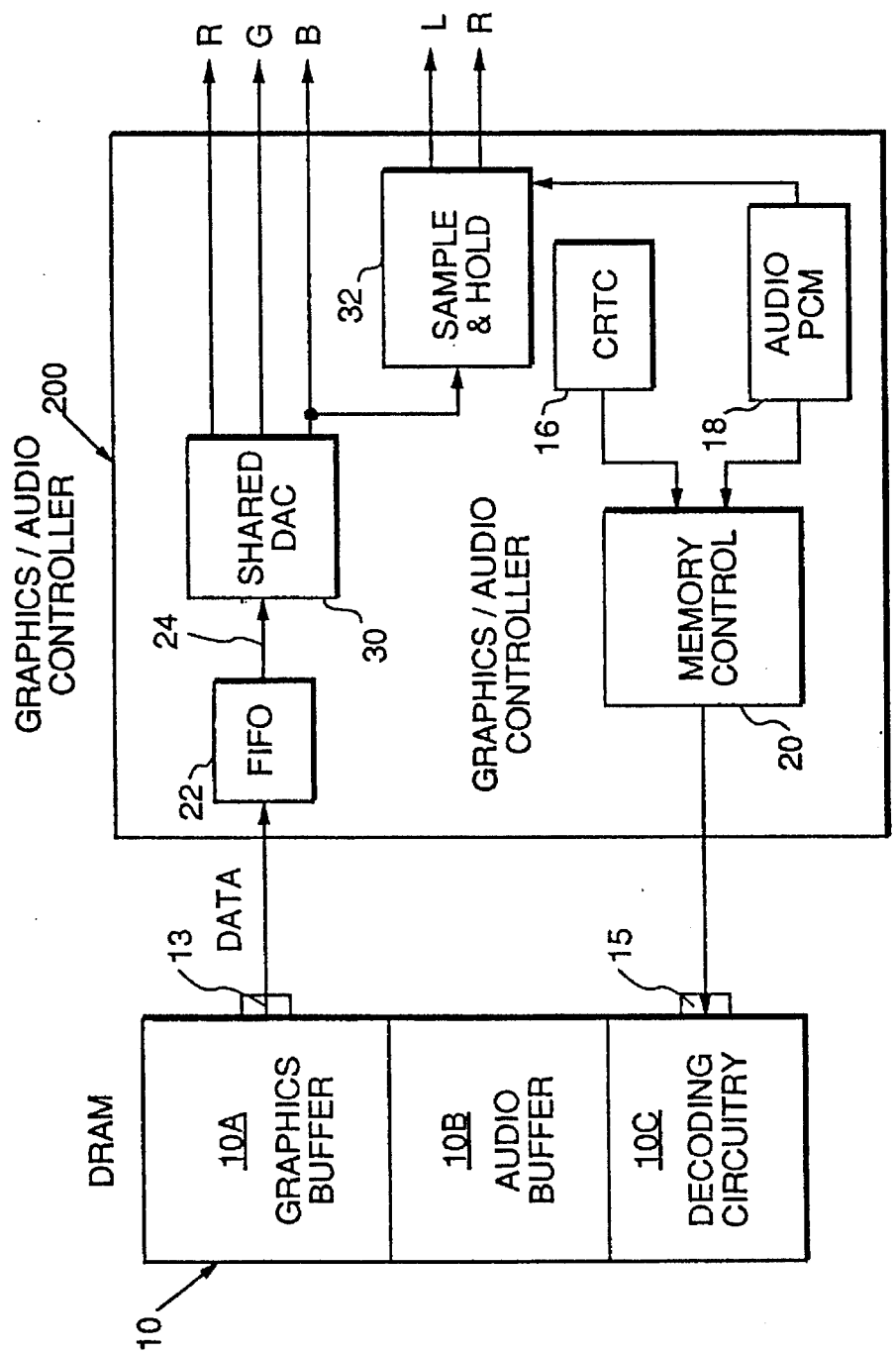
FIG. 2 is a block diagram of an graphics/audio controller system with line rate synchronous audio access and a shared digital-to-analog converter.

Referring next to FIG. 2, a second embodiment of a graphics/audio controller chip 200 according to the present invention is shown. Graphics/audio controller chip 200 supports synchronous graphics and audio access. The embodiment of FIG. 2 is similar to that of FIG. 1 but includes a shared DAC 30 and a sample and hold circuit 32. Circuit blocks corresponding to those of FIG. 1 are numbered identically. Shared DAC 30 is connected to DRAM 10 through FIFO 24 and output port 13. Sample and hold circuit 32 connects to an output line of shared DAC 30 and latches audio data.

During operation of the system of FIG. 2, the retrieval of audio data is sychronized with of the video line rate such that transfer requests from the audio PCM rate timer 18 are serviced during video line flyback time, typically during horizontal blanking. During video flyback, the audio samples are passed through the shared DAC 30 and are captured in sample and hold circuit 32. The audio PCM rate timer 18 synchronizes the transfer request and the sample and hold circuit 32 to cause latching of the data at the appropriate times.

Figure 3:
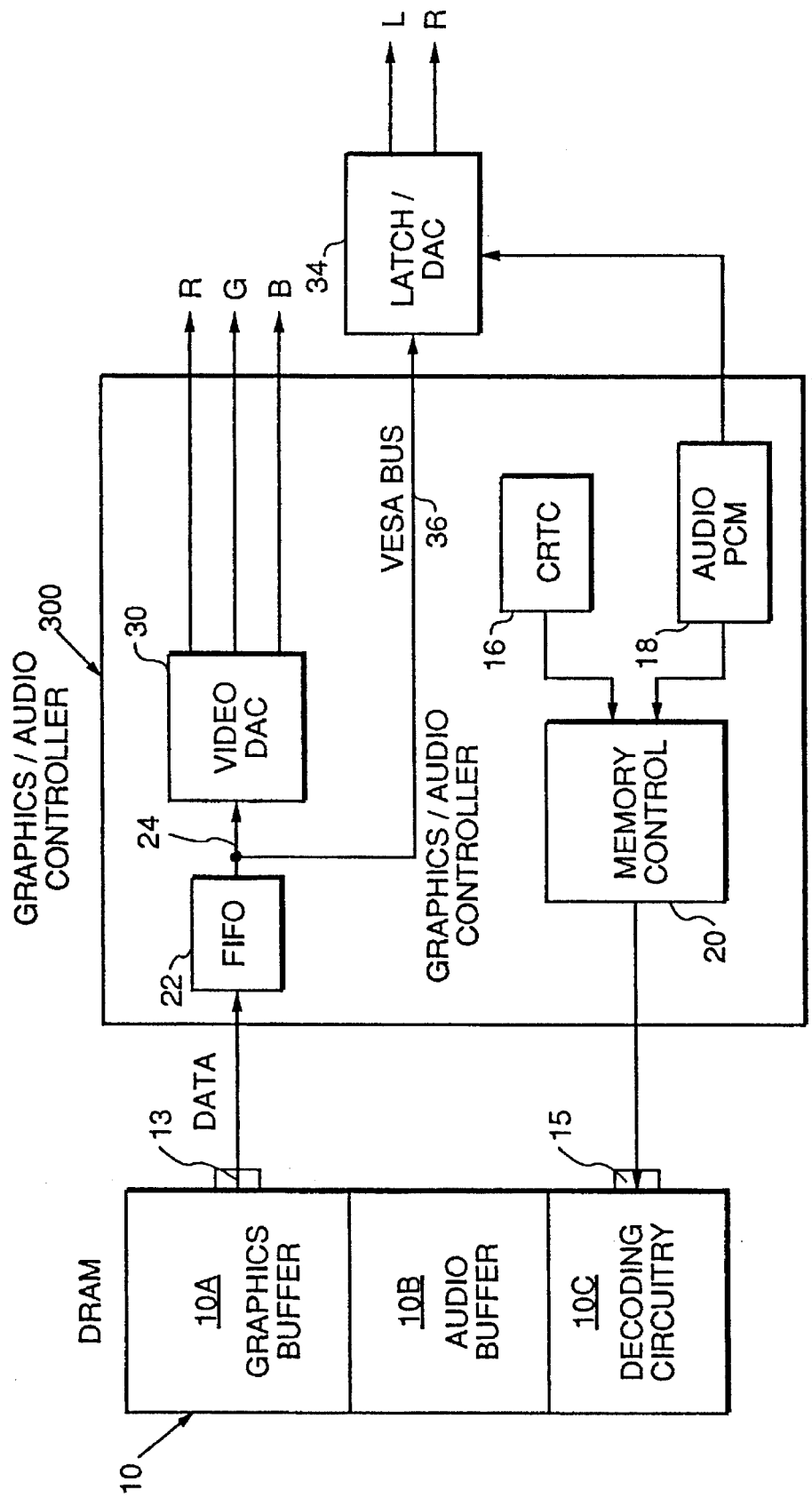
FIG. 3 is a block diagram of an graphics/audio controller system with line rate synchronous audio access and an external digital to analog converter.

FIG. 3 shows a third embodiment of the invention. Graphics/audio controller chip 300 of this embodiment differs from embodiment of FIG. 2 in that an audio DAC 34 is external to the chip 300 and includes an input latch connected to the FIFO buffer 22 through a standard VESA bus 36. The audio PCM rate timer 18 provides a synchronized signal to the audio DAC 34.

Figure 4:
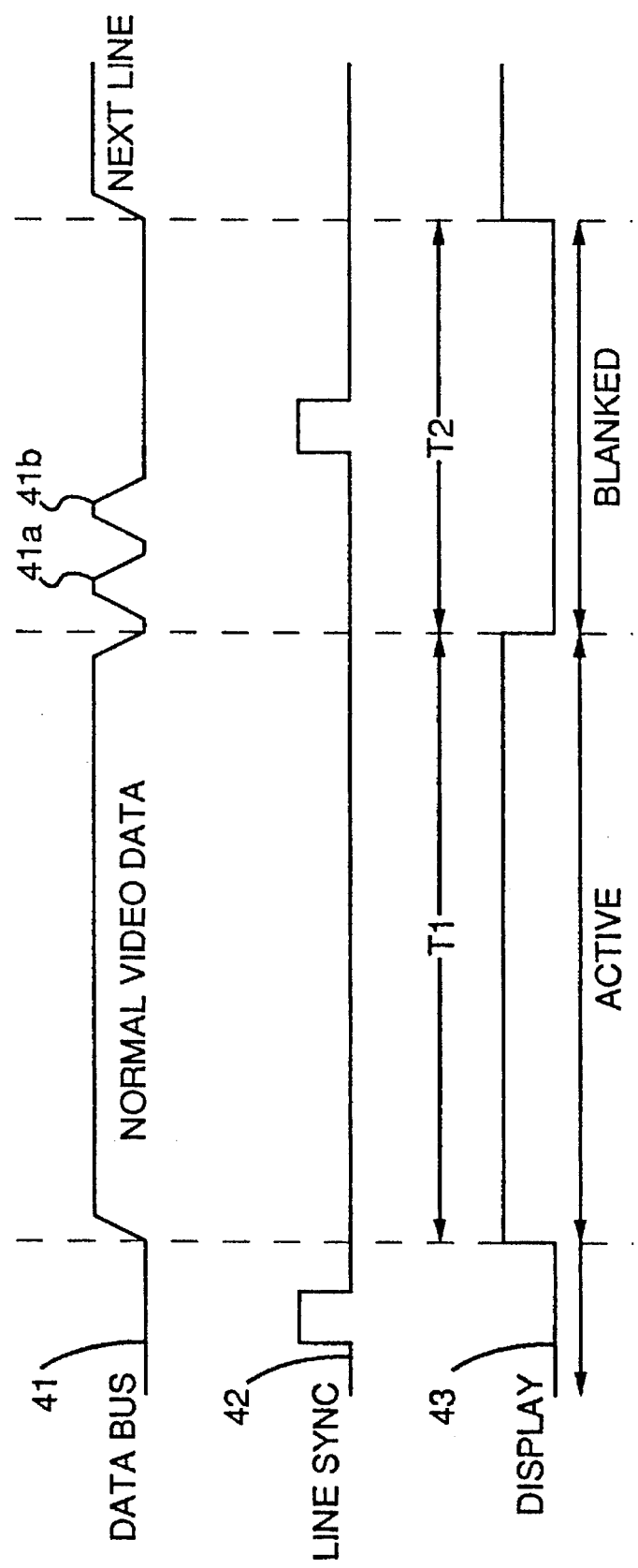
FIG. 4 is a timing diagram which relates line rate synchronous access of data to horizontal blanking of a video display.

FIG. 4 is a timing diagram that applies to synchronized access to video and audio data as used in the embodiments of FIGS. 2 and 3. In FIG. 4, line 41 shows activity on the data bus 24. Lines 42 and 43 respectively show line sync pulses and display signals commonly used for synchronization of video data. Such signals are present on a VESA bus.

During time T1, the display signal is active high, and the data bus 24 is used for transferring video data from FIFO buffer 22. For a standard CRT display, the time T1 corresponds to the time that pixels on a line of a video display are illuminated. During the time T2, the display is blanked, i.e., no new pixels are illuminated, and no video data is required. Accordingly, the audio data may be transmitted during the time T2 without disturbing video data transport. Audio signal pulses such as pulses 41A and 41B may be transmitted during fixed intervals after the end of a video line. In this embodiment only existing VESA bus signals are required to transport audio data.

As will be appreciated by one skilled in the art, the invention is applicable to graphics/audio control systems in general, and is not limited to the specific embodiments disclosed. Numerous modifications and variations within the scope of the present invention are possible. For example, the above discussion details embodiments in which a memory control unit accesses data from a memory section. Alternatively, a control unit may use control signals to access data from other sources, such as hard disks. Also, various element, such as DACs, may be provided on an integrated graphics/audio controller chip or provided external to the controller chip. Similarly, the memory section may be included on the integrated graphics/audio controller chip rather than being external. It is to be understood that the above detail description of the preferred embodiments is intended to be illustrative of the spirit and scope of the invention and should not be taken in a limiting sense.

We claim:

1. A graphics/audio control system comprising:

memory means for storing digital audio data and digital video data, the memory means including an output port for outputting a series of interleaved audio and video digital data, a control port for receiving address signals from a memory control unit, and decoding circuitry for decoding the address signals received by the control port;

a memory control unit responsive to digital video request signals and digital audio request signals and operative to send a series of address signals to the control port of the memory means, the series including address signals that correspond to digital audio data and digital video data stored in said memory means, said series of address signals being decoded by said decoding circuitry and causing the correspondingly stored digital audio data and digital video data to be interleavedly output via the output port of said memory means;

a video request signal timer for sending said digital video request signals to the memory control unit;

an audio request signal timer for sending said digital audio request signals to the memory control unit;

means for providing temporal storage of the interleaved audio and video digital data output from said output port of said memory means, said temporal storage means having an input and an output;

first means for receiving, from said temporal storage means, the digital video data portion of said interleaved audio and video digital data, and for converting said digital video data portion to analog video signals synchronously with the operation of said video request timer, said first means including means for separating said analog video signals into RGB component signals;

second means for receiving, from said temporal storage means, the digital audio data portion of said interleaved audio and video digital data, and for converting said digital audio data portion to analog audio signals synchronously with the operation of said audio request timer, said second means including means for separating said analog audio signals into left and right analog stereo signals; and a single conductor data bus connecting the output port of said memory means to the input of said temporal storage means, for communicating said series of interleaved digital audio and video data signals from said output port of the memory means to the input of said temporal storage means.

2. The system of claim 1, wherein said analog audio signals are suitable for use in driving an audio sound generator, and wherein the audio request signal timer sends the audio request signal to the memory control unit asynchronously relative to the video request signal sent by the video request signal timer to the memory control unit.

3. A graphics/audio controller integrated circuit for processing digital audio data and digital video data stored in a memory means, the memory means including an output port for outputting a series of interleaved digital audio and digital video data, a control port for receiving address signals from a memory control unit, and decoding circuitry for decoding the address signals received by the control port, comprising:

an audio request signal timer for generating audio request signals;

a video request signal timer for generating video request signals;

a control unit responsive to said audio request signals and said video request signals and operative to generate a series of corresponding control signals, wherein the series includes both control signals that cause digital audio data to be retrieved and control signals that cause digital video data to be retrieved from said memory means;

a temporal storage means for temporarily storing digital data;

a single conductor data bus for communicating the series of digital data from the memory means to said temporal storage means, the series of digital data including interleaved digital video data and digital audio data; and means, coupled to said temporal storage means for processing the interleaved digital audio data and digital video data to develop separate analog audio and video signals.

4. The integrated circuit of claim 3, wherein:

(a) the audio request signals and the video request signals are not synchronous; and (b) the audio request signal timer and the video request signal timer are separately synchronized with the means for processing the interleaved digital audio data and the digital video data.

5. The integrated circuit of claim 3, wherein the audio request signal timer and the video request signal timer are synchronized with each other.

6. The integrated circuit of claim 5 wherein the video request signal timer sends video request signals during active display times and not during blanking intervals of a display means driven by said analog video signals; and the audio request signal timer sends audio request signals only during the blanking intervals of said display means.

7. A graphics/audio control system comprising:

memory means for storing digital audio data and digital video data, the memory means including an output port for, outputting a series of interleaved audio and video digital data to a control port for receiving address signals from a memory control unit, and decoding circuitry for decoding the address signals received by the control port;

a memory control unit which in response to digital video request signals and digital audio request signals sends a series of address signals to the control port of said memory means, the series alternately including address signals that correspond to digital audio data and digital video data stored in said memory means, said series of address signals being decoded by said decoding circuitry and causing the correspondingly stored digital audio data and digital video data to be interleavedly output via the output port of said memory means;

a video request signal timer for sending said digital video request signals to the memory control unit;

an audio request signal timer synchronized with said video request timer for sending said digital audio request signals to the memory control unit in synchronism with said digital video data request signals;

means for temporal storage of said interleaved audio and video digital data output from said output port of said memory section, said temporal storage means having an input for receiving the interleaved digital data, and an output; and converter means for receiving the temporarily stored digital data from the output of said temporal storage means, and for converting the video data portion thereof to analog RGB component signals and for converting the audio data portions thereof to left and right analog stereo signals.

8. The system of claim 7, wherein said RGB component signals are suitable for use in driving a video display means;

said video request signal timer sends video request signals to said converter means during active display times and not during video blanking intervals; and said audio request signal timer sends audio request signals to said converter means only during the video blanking intervals.

9. The system of claim 7 wherein said converter means includes first means having three output terminals;

said first means being operative to convert the video portion of said digital video and audio data into analog RGB signals respectively output on said three output terminals;

said first means being alternately operative to convert the audio portion of said digital audio data to analog audio signals output on one of said three output terminals; and said converter means further including second means coupled to said one output terminal, said second means being responsive to a signal generated by said audio request signal timer and operative to convert said analog audio signals to left and right stereo analog signals.

10. The system as in claim 7, wherein:

said converter means includes first means having three output terminals, said converter means further including second means responsive to a signal from said audio request signal timer and operative to convert the audio data portions of the temporarily stored digital data to analog left and right stereo signals, said converter means further including a VESA bus for communicating said audio data portion from said temporal storage means to said second means.

* * * * *